US008632330B2

(12) United States Patent
Jones et al.

(10) Patent No.: US 8,632,330 B2

(45) Date of Patent: Jan. 21, 2014

(54) TOOLS FOR MANUFACTURING COMPOSITE PARTS AND METHODS FOR USING SUCH TOOLS

(75) Inventors: Darrell D. Jones, Mill Creek, WA (US); Joseph D. Brennan, Shoreline, WA (US); Mark W. King, Maple Valley, WA (US); Kurtis S. Willden, Kent, WA (US); George D. Hempstead, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 647 days.

(21) Appl. No.: 12/623,942

(22) Filed: Nov. 23, 2009

(65) Prior Publication Data

US 2010/0068326 A1 Mar. 18, 2010

Related U.S. Application Data

(62) Division of application No. 11/344,458, filed on Jan. 31, 2006, now Pat. No. 7,655,168.

(51) Int. Cl.
*B28B 3/02* (2006.01)

(52) U.S. Cl.
USPC ........... 425/356; 425/521; 425/398; 425/419; 425/457; 425/469; 264/258; 264/257; 264/241; 264/500; 264/502; 264/503; 264/510; 264/570; 264/239

(58) Field of Classification Search
USPC ................. 425/521, 356, 398, 419, 457, 469; 264/258, 257, 241, 500, 502, 503, 510, 264/570, 239
See application file for complete search history.

(56) References Cited

U.S. PATENT DOCUMENTS 1,504,547 A 4/1919 Egerton
1,433,879 A 10/1922 Fancher et al.
(Continued)

FOREIGN PATENT DOCUMENTS

CA 2487697 A1 5/2006
DE 742682 C 12/1943
(Continued)

OTHER PUBLICATIONS

"A Composite Preform", IP.com Technical Disclosure, IPCOM000007326D, Mar. 14, 2002, pp. 1-3.

(Continued)

*Primary Examiner* — Monica Huson
*Assistant Examiner* — Saeed Huda
(74) *Attorney, Agent, or Firm* — Yee & Associates, P.C.

(57) ABSTRACT

Tools for manufacturing composite parts and methods for using such tools are disclosed herein. A method in accordance with one aspect of the invention includes manufacturing a fiber-reinforced resin part from a plurality of fibers positioned on a tool having a female mold surface. The mold surface can include a first side region, a second side region, an interior region between the first and second side regions, and transition regions between the first and second side regions and the interior region. The method includes positioning a compaction tool over the mold surface. The compaction tool includes a first pressing device and a second pressing device carrying the first pressing device. The method further includes pressing a first portion of the fibers against the transition regions with the first pressing device without generally compacting the portions of the fibers outboard of the transition regions. After pressing the first portion of the fibers, the method includes pressing a second portion of the fibers against the first and second side regions and shoulder regions of the mold surface outboard of the first and second side regions.

18 Claims, 5 Drawing Sheets

200 206 211 211 208 209 230 210 262b 262a 256 252 262c 232 240 210 256 213 204 204 213 260 220 220 244 254 216 250 202 254 242 214 246 219 218 212 219

(56) References Cited

U.S. PATENT DOCUMENTS 1,965,716 A 7/1934 Thoms et al.
2,750,629 A 6/1956 Baudou
2,981,976 A 5/1961 Maier
3,376,184 A 4/1968 Ritchey et al.
3,526,558 A 9/1970 Beeson
3,693,924 A 9/1972 Blatherwick
3,843,756 A 10/1974 Talbott et al.
3,975,363 A 8/1976 Jones
3,990,291 A 11/1976 Evertz et al.
4,132,755 A 1/1979 Johnson
4,254,735 A 3/1981 Postupack et al.
4,270,964 A 6/1981 Flaskett
4,338,070 A 7/1982 Nava et al.
4,366,698 A 1/1983 Gill
4,367,644 A 1/1983 Kramer et al.
4,411,148 A 10/1983 Aschauer et al.
4,416,170 A 11/1983 Gibson et al.
4,443,401 A 4/1984 Turner
4,475,976 A 10/1984 Mittelstadt et al.
4,504,341 A 3/1985 Radzwill et al.
4,614,558 A 9/1986 Kobe
4,657,717 A 4/1987 Cattanach et al.
4,726,924 A 2/1988 Mittelstadt
4,780,262 A 10/1988 Von Volkli
4,902,215 A 2/1990 Seemann, III
4,922,232 A 5/1990 Bosich
4,933,232 A 6/1990 Trout et al.
4,946,526 A 8/1990 Petty-Galis et al.
4,961,700 A 10/1990 Dunbar
5,022,248 A 6/1991 Brooks et al.
5,040,962 A 8/1991 Waszeciak et al.
5,060,501 A 10/1991 Heath
5,087,193 A 2/1992 Herbert, Jr.
5,108,532 A 4/1992 Thein et al.
5,129,813 A 7/1992 Shepherd
5,152,949 A 10/1992 Leoni et al.
5,178,812 A 1/1993 Sanford et al.
5,188,787 A * 2/1993 King et al. .................... 264/153
5,286,438 A 2/1994 Dublinski et al.
5,292,475 A 3/1994 Mead et al.
5,304,057 A 4/1994 Celerier et al.
5,327,764 A 7/1994 Weykamp et al.
5,366,431 A 11/1994 Smith et al.
5,366,684 A 11/1994 Corneau, Jr.
5,464,337 A 11/1995 Bernardon et al.
5,582,058 A 12/1996 Knudson
5,683,648 A * 11/1997 Fortin ........................... 264/550
5,690,973 A 11/1997 Kindt-Larsen et al.
5,707,576 A 1/1998 Asher
5,714,179 A 2/1998 Goodridge et al.
5,772,950 A 6/1998 Brustad et al.
5,824,255 A 10/1998 Ross et al.
5,830,305 A * 11/1998 Andersen et al. ............. 156/242
5,846,464 A 12/1998 Hoffman
5,882,462 A 3/1999 Donecker et al.
5,939,007 A 8/1999 Iszczyszyn et al.
6,089,061 A 7/2000 Haas et al.
6,139,942 A 10/2000 Hartness et al.
6,159,414 A 12/2000 Tunis, III et al.
6,229,819 B1 5/2001 Darland et al.
6,245,275 B1 6/2001 Holsinger
6,269,677 B1 8/2001 Torvinen et al.
6,299,819 B1 10/2001 Han
6,495,086 B1 12/2002 Uytterhaeghe et al.
6,511,570 B2 1/2003 Matsui
6,558,590 B1 5/2003 Stewart
6,692,681 B1 2/2004 Lunde
6,723,272 B2 4/2004 Montague et al.
6,749,784 B2 6/2004 Blanchon et al.
6,814,916 B2 11/2004 Willden et al.
6,823,578 B2 11/2004 Anderson et al.
6,843,953 B2 1/2005 Filsinger et al.
6,855,284 B2 2/2005 Lanni et al.
6,862,989 B2 3/2005 Belanger et al.
6,929,770 B2 8/2005 Caldwell, Jr.
6,967,000 B2 11/2005 Vaara
7,021,096 B2 4/2006 Barnett
7,091,300 B2 8/2006 Luhmann et al.
7,118,370 B2 10/2006 Willden et al.
7,126,496 B2 10/2006 Greene
7,132,161 B2 11/2006 Knowles et al.
7,141,199 B2 11/2006 Sana et al.
7,160,498 B2 1/2007 Mataya
7,306,450 B2 12/2007 Hanson
7,334,782 B2 2/2008 Woods et al.
7,429,172 B2 * 9/2008 Chotard ........................ 425/521
7,464,508 B2 12/2008 Fournie et al.
7,527,759 B2 5/2009 Lee et al.
7,601,421 B2 10/2009 Khabashesku et al.
7,622,066 B2 11/2009 Brustad et al.
7,655,168 B2 2/2010 Jones et al.
7,708,546 B2 5/2010 Lee et al.
7,824,171 B2 11/2010 Hanson et al.
7,951,318 B2 5/2011 Hanson
7,959,753 B2 6/2011 Nunez Delgado et al.
8,105,068 B2 1/2012 Ross et al.
2001/0045684 A1 11/2001 Blanchon
2002/0167119 A1 11/2002 Hemphill
2003/0205156 A1 11/2003 Belanger et al.
2003/0234471 A1 12/2003 Kuroiwa et al.
2004/0041304 A1 3/2004 Willden et al.
2004/0043196 A1 3/2004 Willden et al.
2004/0071870 A1 4/2004 Knowles et al.
2004/0145080 A1 7/2004 Tanaka
2004/0145095 A1 7/2004 McCollum et al.
2004/0219855 A1 11/2004 Tsotsis
2005/0051932 A1 3/2005 Danzik
2005/0059309 A1 3/2005 Tsotsis
2005/0073076 A1 4/2005 Woods et al.
2005/0086991 A1 4/2005 Barnett
2005/0142239 A1 6/2005 Frank
2005/0178083 A1 8/2005 Fournie et al.
2006/0017200 A1 1/2006 Cundiff et al.
2006/0068170 A1 3/2006 Hanson
2006/0071817 A1 4/2006 Greene
2006/0166003 A1 7/2006 Khabashesku et al.
2006/0231981 A1 10/2006 Lee et al.
2007/0175171 A1 8/2007 Delgado et al.
2007/0176323 A1 8/2007 Jones et al.
2008/0054523 A1 3/2008 Hanson
2008/0286564 A1 11/2008 Tsotsis
2009/0123588 A1 5/2009 Lee et al.
2009/0320292 A1 12/2009 Brennan et al.
2010/0074979 A1 3/2010 Cundiff et al.
2010/0102482 A1 4/2010 Jones et al.
2011/0195230 A1 8/2011 Hanson

FOREIGN PATENT DOCUMENTS

DE 4234002 A1 4/1994
DE 19536675 C1 2/1997
EP 0659541 A1 6/1995
EP 1136239 A2 9/2001
EP 1393873 A2 3/2004
EP 1972428 A2 9/2008
EP 2133263 A2 12/2009
FR 2035314 A5 12/1970
FR 2162296 A1 12/1971
FR 2667013 A1 3/1992
FR 2771332 A1 5/1999
FR 2844472 3/2004
GB 2139934 A 11/1984
JP 61043542 A 3/1986
JP 2001310798 A 11/2011
WO 2004025003 A2 3/2004
WO 2005095091 A1 10/2005
WO 2006014825 A1 2/2006
WO 2006039124 A2 4/2006
WO 2006048652 A1 5/2006

(56) References Cited

FOREIGN PATENT DOCUMENTS

| WO | 2006113048 A2 | 10/2006 |
|---|---|---|
| WO | 2010047980 A1 | 4/2010 |

OTHER PUBLICATIONS

Musch et al., "Tooling with reinforced elastomeric materials", Composites Manufacturing vol. 3 No. 2, 1992, pp. 101-111.
Ando et al., "Growing Carbon Nanotubes," Materials Today, Oct. 2004, vol. 7, No. 10, pp. 22-29.
Brittles, "New Developments in Resin Transfer Moulding," Proc. 19th International Composites Congress, Nov. 1994, pp. 11-26.
European Search Report, dated Aug. 5, 2008, regarding Application No. EP08012344 (EP1972428), 6 pages.
European Search Report, dated Oct. 10, 2011, regarding Application No. EP09251515 (EP2133263), 2 pages.
Garcia et al., "Hybrid Carbon Nanotube-Composite Architectures," MTL Annual Research Report, Sep. 2006, p. 208.
"Growing Carbon Nanotubes Aligned With Patterns," NASA Tech Briefs No. NPO-30205, Oct. 2002, http://nasatech.com/Briefs/Oct02/NPO30205.html, 2 pages.
International Search Report, dated Dec. 7, 2005, regarding Application No. PCT/US2005/026141 (WO2006014825), 3 pages.
International Search Report, dated May 19, 2006, regarding Application No. PCT/US2005/033279 (WO2006039124), 5 pages.
International Search Report, dated Oct. 16, 2006, regarding Application No. PCT/US2006/010825 (WO2006113048), 4 pages.
International Search Report, dated Jan. 27, 2010, regarding Application No. PCT/US2009/060245 (WO2010047980), 3 pages.
"The Longest Carbon Nanotubes You Have Ever Seen," http://www.spacemart.com/reports/The_Longest_Carbon_Nanotubes_You_Have_Ever_Seen_999.html, May 14, 2007, 1 page.
"The Wondrous World of Carbon Nanotubes," http://students.chem.tue.nl/ifp03/Wondrous%20World%20of%20Carbon%20Nanotubes_Final.pdf, Feb. 27, 2003, pp. 1-23.
USPTO Office Action, dated Mar. 22, 2007, regarding U.S. Appl. No. 10/953,670, 19 pages.
USPTO Notice of Allowance, dated Jul. 31, 2007, regarding U.S. Appl. No. 10/953,670, 6 pages.
USPTO Office Action, dated Sep. 3, 2010, regarding U.S. Appl. No. 11/927,003, 14 pages.
USPTO Notice of Allowance, dated Feb. 2, 2011, regarding U.S. Appl. No. 11/927,003, 9 pages.
USPTO Office Action, dated Apr. 4, 2008, regarding U.S. Appl. No. 10/899,660, 21 pages.
USPTO Final Office Action, dated Oct. 16, 2008, regarding U.S. Appl. No. 10/899,660, 17 pages.
USPTO Notice of Allowance, dated Jun. 22, 2009, regarding U.S. Appl. No. 10/899,660, 14 pages.
USPTO Office Action, dated May 11, 2012, regarding U.S. Appl. No. 12/576,759, 18 pages.
USPTO Office Action, dated May 28, 2008, regarding U.S. Appl. No. 11/105,104, 14 pages.
USPTO Notice of Allowance, dated Jan. 7, 2009, regarding U.S. Appl. No. 11/105,104, 3 pages.
USPTO Supplemental Notice of Allowance, dated Feb. 12, 2009, regarding U.S. Appl. No. 11/105,104, 4 pages.
USPTO Office Action, dated May 27, 2009, regarding U.S. Appl. No. 12/354,856, 12 pages.
USPTO Notice of Allowance, dated Dec. 23, 2009, regarding U.S. Appl. No. 12/354,856, 8 pages.
USPTO Miscellaneous Communication, dated Mar. 2, 2010, regarding U.S. Appl. No. 12/354,856, 4 pages.
USPTO Office Action, dated Oct. 15, 2008, regarding U.S. Appl. No. 11/344,458, 22 pages.
Response to Office Action, dated Feb. 13, 2009, regarding U.S. Appl. No. 11/344,458, 11 pages.
USPTO Office Action, dated May 6, 2009, regarding U.S. Appl. No. 11/344,458, 6 pages.
Response to Office Action, dated May 26, 2009, regarding U.S. Appl. No. 11/344,458, 9 pages.
USPTO Notice of Allowance, dated Sep. 28, 2009, regarding U.S. Appl. No. 11/344,458, 7 pages.
USPTO Supplemental Notice of Allowance, dated Oct. 30, 2009, regarding U.S. Appl. No. 11/344,458, 4 pages.
USPTO Supplemental Notice of Allowance, dated Nov. 12, 2009, regarding U.S. Appl. No. 11/344,458, 5 pages.
USPTO Office Action, dated May 14, 2012, regarding U.S. Appl. No. 12/138,975, 12 pages.
USPTO Office Action, dated Mar. 9, 2010, regarding U.S. Appl. No. 12/258,404, 9 pages.
USPTO Final Office Action, dated Aug. 27, 2010, regarding U.S. Appl. No. 12/258,404, 10 pages.
USPTO Final Office Action, dated Mar. 11, 2011, regarding U.S. Appl. No. 12/258,404, 8 pages.
USPTO Office Action, dated Jul. 20, 2011, regarding U.S. Appl. No. 12/258,404, 6 pages.
USPTO Final Office Action, dated Jan. 17, 2012, regarding U.S. Appl. No. 12/258,404, 7 pages.
Final Office Action, dated May 15, 2013, regarding USPTO U.S. Appl. No. 13/090,746, 19 pages.
Notice of Allowance, dated Jun. 10, 2013, regarding USPTO U.S. Appl. No. 12/258,404, 38 pages.
Office Action, dated Dec. 5, 2012, regarding USPTO U.S. Appl. No. 13/090,746, 38 pages.
Final Office Action, dated Feb. 20, 2013, regarding USPTO U.S. Appl. No. 12/576,759, 41 pages.
Final Office Action, dated Nov. 9, 2012, regarding USPTO U.S. Appl. No. 12/138,975, 32 pages.

* cited by examiner 200
208
230
209
260
262a
262b
252
250
262c
232
256
256
240
204
204
220
220
310
310
244
216
202
214
254
242
254
219
218
246
219
212

200
208
230
209
260
262a
262b
252
250
262c
232
256
256
240
204
204
220
220
310
310
244
216
F1
202
214
254
242
254
219
218
246
219
212

TOOLS FOR MANUFACTURING COMPOSITE PARTS AND METHODS FOR USING SUCH TOOLS

This application is a divisional of application Ser. No. 11/344,458, filed Jan. 31, 2006, issued as U.S. Pat. No. 7,655, 168.

TECHNICAL FIELD

The following disclosure relates generally to composite part manufacturing and, more particularly, to tools for manufacturing composite parts and methods for using such tools.

BACKGROUND

Fiber-reinforced resin materials, or "composite" materials as they are commonly known, have many applications in the aerospace, automotive, and marine fields because of their high strength-to-weight ratios, corrosion resistance, and other unique properties. Conventional composite materials' typically include glass, carbon, or polyaramide fibers in woven and/or non-woven configurations. The fibers can be pre-impregnated with uncured or partially cured resin to form fiber plies (often termed "prepregs") in a raw material stage. The fiber plies can be manufactured into parts by laminating them on a mold surface. Heat and pressure can be applied to the laminated plies to cure the resin and harden the laminate in the shape of the mold. The heat and pressure can be applied with an autoclave, a heated flat or contoured forming tool, or a combination of methods including the use of a vacuum bag.

Composite parts can be formed in the above manner on both male and female tools. With male tools, the fiber plies are applied to an exterior mold surface that forms an inner mold line of the part. Adding plies to the lay-up on a male tool increases the thickness of the part and changes the outer mold line, but the inner mold line remains unchanged. Conversely, with female tools, the fiber plies are applied to an interior mold surface that forms an outer mold line of the part. Adding plies to the lay-up on a female tool increases the thickness of the part and changes the inner mold line, but the outer mold line remains unchanged.

One problem that arises when manufacturing composite parts with tools including female cavities, however, is that composite materials tend to have defects (e.g., bridging, resin richness, etc.) at transition areas or internal radii on the tooling surface. Bridging, for example, occurs when the fiber plies span across the internal radii of the female tool instead of fitting flush against these contour areas of the tool surface. Resin richness results from excess resin migration to the outsides of bends, curves, and other radius or joggle areas of the composite structure.

FIG. 1, for example, illustrates a cross-sectional end view of a composite material 110 (e.g., fiber plies or prepregs) laid up on a portion of a female tool 100 in accordance with the prior art. The female tool 100 can include a mold surface 102 having a channel 103 with internal radii or transition regions 107 and external shoulder regions 109. A pressing member 120 is positioned over the composite material 110. As the pressing member 120 is moved toward the female tool 100 (as shown by arrows A), the pressing member moves the composite material 110 firmly against the mold surface 102. One problem with this arrangement, however, is that when the composite material 110 is not formed completely into the mold surface 102, bridging can occur between the composite material and the mold surface at the transition regions 107. Moreover, the shoulder areas 109 of the mold surface 102 are particularly susceptible to resin richness. As discussed above, bridging and resin richness can reduce the fiber density in the affected regions and, accordingly, compromise the structural integrity of the finished part. In many cases, such defects require that the part be reworked or, in some cases, scrapped altogether.

One approach for addressing this drawback with female tools is to use a vacuum bagging process. Such a process, for example, can include positioning one or more vacuum bags (not shown) over the composite material 110 laid up on the mold surface 102 of the female tool 100. As the vacuum bags are evacuated, the outside air pressure presses the composite material 110 firmly against the mold surface 102. Vacuum bagging processes can help reduce problems with bridging and resin richness in some cases, but such processes are extremely slow and, accordingly, can significantly limit the production rate of composite parts in a commercial and/or industrial setting.

SUMMARY

The present invention is directed generally toward tools for manufacturing composite parts and methods for using such tools. A method in accordance with one aspect of the invention includes manufacturing a fiber-reinforced resin part from a plurality of fibers positioned on a tool having a female mold surface. The mold surface can include a first side region, a second side region, an interior region between the first and second side regions, and transition regions between the first and second side regions and the interior region. The method can include positioning a compaction tool over the mold surface. The compaction tool can include a first pressing device and a second pressing device carrying the first pressing device. The first pressing device is axially movable relative to and independent of the second pressing device. The method can further include pressing a first portion of the fibers against the transition regions of the mold surface with the first pressing device without generally compacting the portions of the fibers outboard of the transition regions. After pressing the first portion of the fibers against the transition regions, the method can include pressing a second portion of the fibers against the first and second side regions and shoulder regions of the mold surface outboard of the first and second side regions. In several embodiments, the method can further include (a) maintaining the pressure on the first portion of the fibers for a first dwell time before pressing the second portion of the fibers, and (b) maintaining the pressure on the second portion of the fibers for a second dwell time.

A tooling system for manufacturing a composite part in accordance with another aspect of the invention can include a tool having a female mold surface configured to support a plurality of fibers and a compaction tool configured to cooperate with the tool. The mold surface can include a first side region, a second side region, and an interior region between the first and second side regions. The mold surface can further include transition regions between the first and second side regions and the interior region and shoulder regions outboard of the first and second side regions. The compaction tool can include a support member releasably attached to the tool and a pressing member carried by the support member. The pressing member can be configured to move away from the support member toward the mold surface to compress a portion of the fibers against the mold surface. The pressing member can include a first pressing device and a second pressing device carrying the first pressing device. In several embodiments, the first pressing device is axially movable relative to and independent of the second pressing device. The compaction tool can further include a first actuation device adjacent to the first pressing device and one or more second actuation devices adjacent to the second pressing device. The first actuation device is positioned to move the first pressing device toward the mold surface, and the one or more second actuation devices are positioned to move the second pressing device toward the mold surface.

DETAILED DESCRIPTION

The present disclosure describes methods and systems for manufacturing composite parts. Certain specific details are set forth in the following description and in FIGS. 2A-3C to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
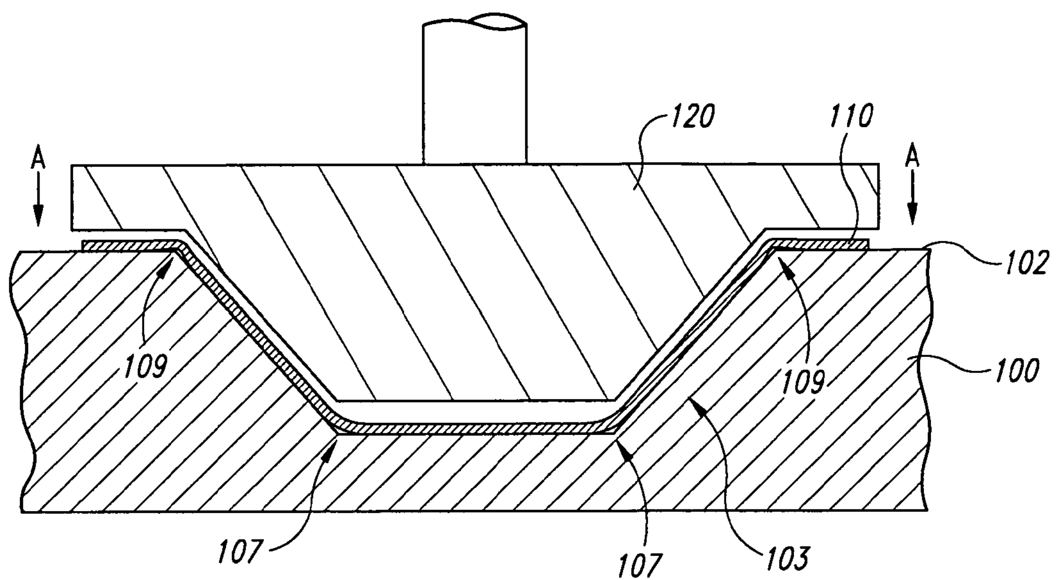
FIG. 1 is a cross-sectional end view of a composite material laid up on a female tool in accordance with the prior art.
Figure 2A:
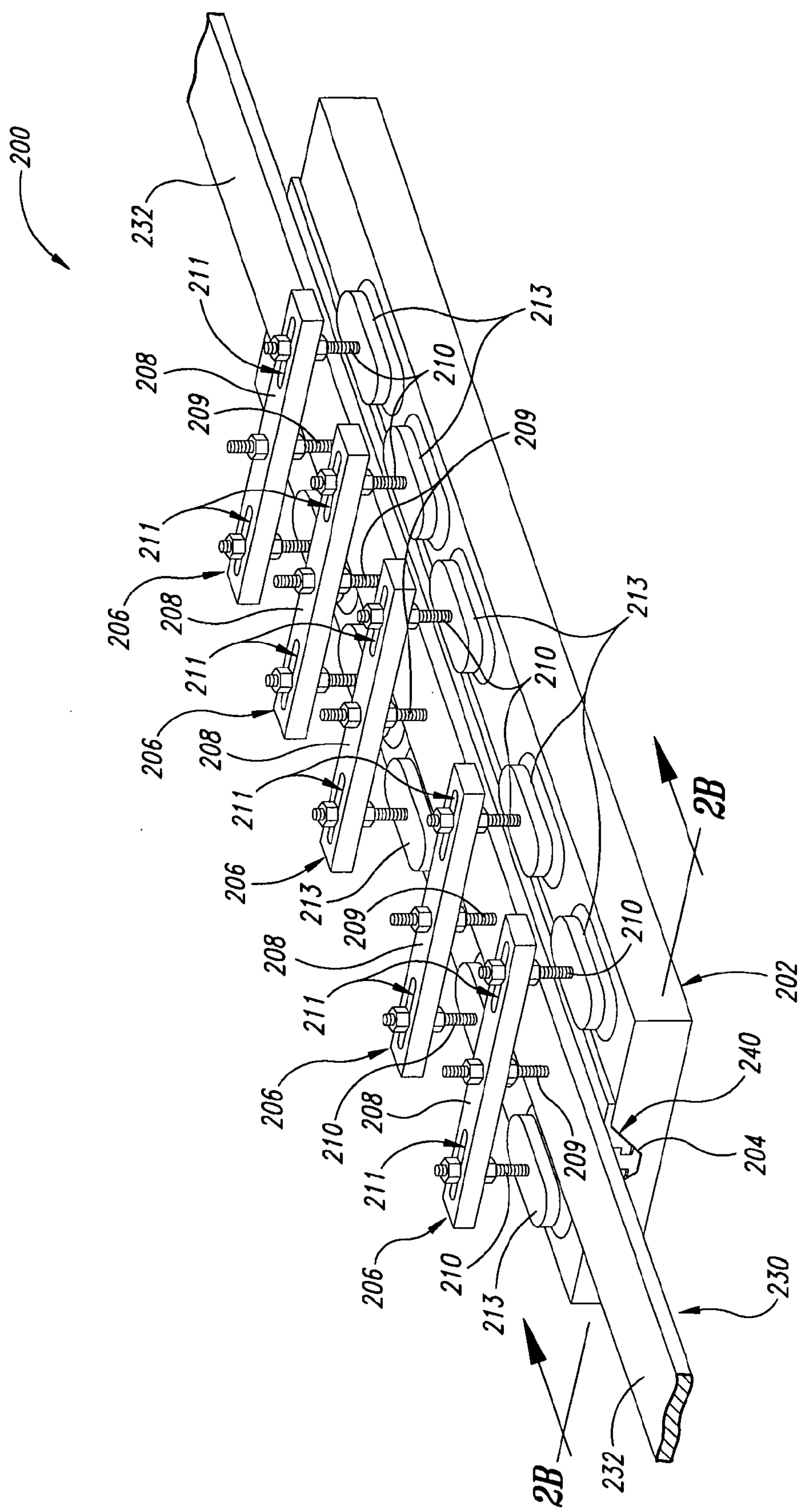
FIG. 2A is an isometric view of a composite tooling system configured in accordance with an embodiment of the invention.

FIG. 2A is an isometric view of a composite tooling system 200 configured in accordance with an embodiment of the invention. The system 200 can be used, for example, to manufacture composite parts, such as composite frame sections for aircraft fuselages (e.g., stringers) and/or other structures. The system 200 includes a compaction or pressing tool 230 positioned along a tool 202 ("tool 202") having a female mold surface or cavity and configured to cooperate with the tool 202 to shape or otherwise manipulate a composite material (not shown) carried by the tool 202 into a desired structure. More specifically, the compaction tool 230 includes a pressing member or contoured former 240 positioned to engage the composite material and firmly press the composite material against a mold surface 204 of the tool 202 having a configuration based at least in part on a desired outer profile of the composite part to be manufactured. The various components of the compaction tool 230 and its operation in the manufacture of composite structures are discussed in greater detail below.

Figure 2B:
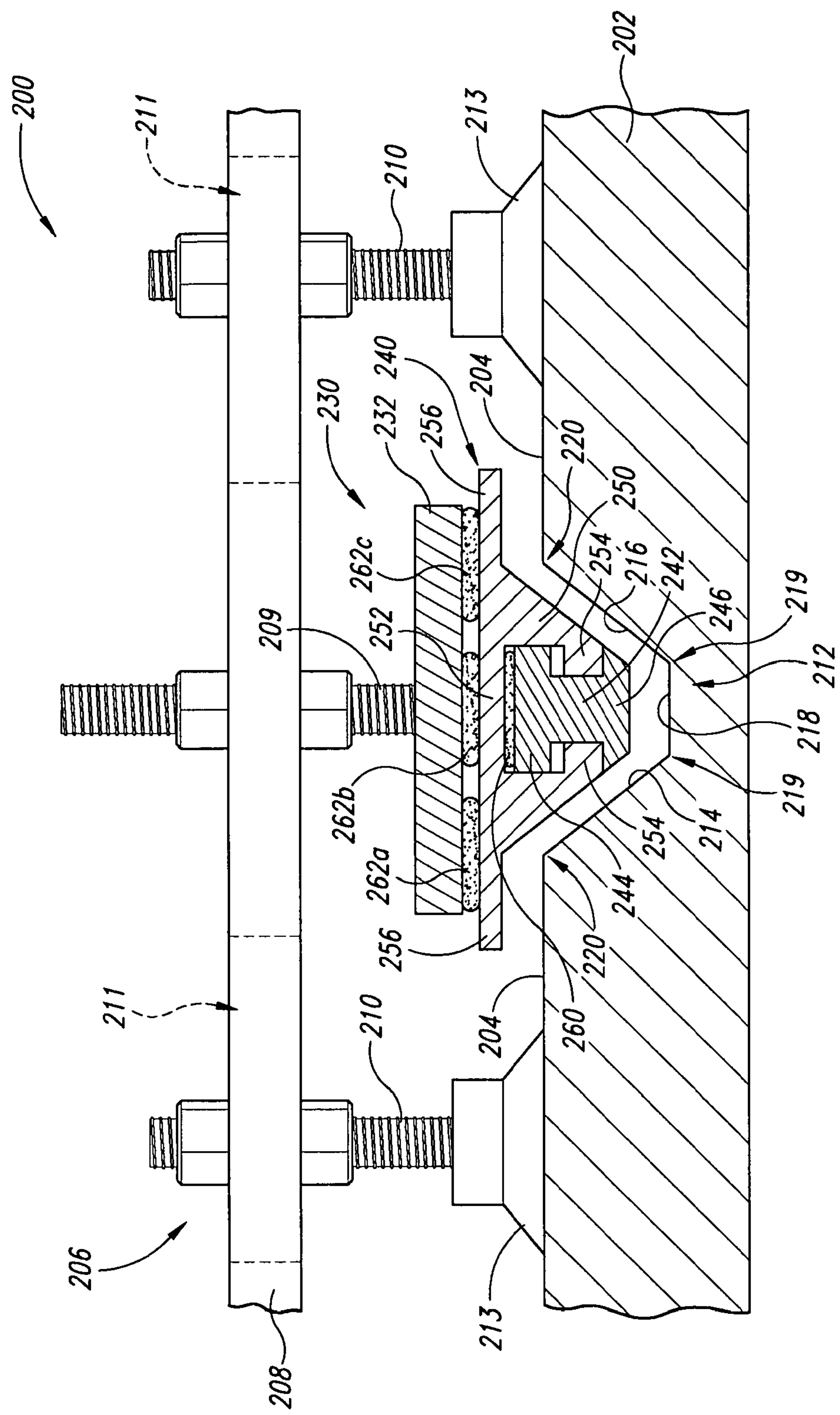
FIG. 2B is a cross-sectional view of the composite tooling system taken along line 2B-2B of FIG. 2A.

FIG. 2B is a cross-sectional view of the composite tooling system 200 taken along line 2B-2B of FIG. 2A. Referring to FIGS. 2A and 2B together, the compaction tool 230 can include a support member 232 extending lengthwise along at least a portion of the tool 202. The support member 232, for example, can include a relatively long and straight plate or "strong-back" positioned at a desired location above the tool 202. In other embodiments, however, the support member 232 can have a curvature (including a compound curvature) based on a desired configuration of the composite part to be manufactured.

The compaction tool 230 can be held against the tool 202 by an arrangement of attachment members 206 operably coupled to a plurality of holding devices 213 (e.g., vacuum cups) positioned against a surface of the tool 202. The holding devices 213 are configured to releasably hold the compaction tool 230 in place against the tool 202 with sufficient force to offset a pressing force applied by the compaction tool 230 to the material laid up on the tool 202 for processing without damaging or otherwise disrupting the surface of the tool 202. The attachment members 206 can include an attachment bar 208 releasably coupled to the compaction tool 230 using one or more suitable first fasteners 209 and releasably coupled to the holding devices 213 using one or more suitable second fasteners 210. In one aspect of this embodiment, the attachment bars 208 can include a relatively large amount of adjustability relative to the tool 202 and/or the compaction tool 230 to account for the various configurations of the composite structures to be manufactured with the system 200. The attachment bars 208, for example, can include slots 211 that allow the bars to be adjustably moved relative to the tool 202 during installation. In other embodiments, the attachment members 206 and holding devices 213 can have different arrangements. In still further embodiments, the compaction tool 230 can be held against the tool 202 using other suitable methods that do not damage the tool's surface.

As best seen in FIG. 2B, the mold surface 204 of the tool 202 can include a channel 212 having a first side region 214 spaced apart from a second side region 216 by an interior region 218. The first and second side regions 214 and 216 face at least partially toward each other. The first and second side regions 214 and 216 are spaced apart from the interior region 218 by interior transition regions or internal radii 219. In the illustrated embodiment, the interior transition regions 219 include surfaces defining internal beveled surfaces. In other embodiments, however, the interior transition regions 219 can have other shapes, including curved surfaces with elliptical, oval, and other curved components. The mold surface 204 further includes shoulder regions 220 at an upper portion of the channel 212. The shoulder regions 220 each face in generally different directions than the first and second side regions 214 and 216. In other embodiments, the mold surface 204 and/or channel 212 can have different configurations.

The pressing member 240 includes a first pressing device or plunger 242 and a second pressing device 250 positioned to carry the first pressing device 242. In the illustrated embodiment, for example, the first pressing device 250 is positioned within at least a portion of second pressing device 242. As explained in greater detail below with reference to FIGS. 3A-3C, the first pressing device 242 is axially movable relative to and independent of the second pressing device 250. The pressing member 240 (including both the first and second pressing devices 242 and 250) can be formed from a flexible, ultra-high molecular weight (UHMW) polymer material that can hold a composite material (not shown) laid up on the mold surface 204 without damaging and/or contaminating the material. Although the UHMW material can be slightly flexible, the shape of the pressing member 240 remains generally constant while moving toward the mold surface 204 and when compacting or otherwise engaging the composite material against the mold surface. In other embodiments, the pressing member 240 can be formed from another suitable material and/or have a different configuration. For example, in some embodiments the pressing member 240 can include one or more slotted portions, a softer bottom or "shoe" portion composed of the same material or a different material as the pressing member, and/or one or more discontinuous portions. In still further embodiments, the first pressing device 242 and the second pressing device 250 can be formed from different materials.

The first pressing device 242 includes a first base portion 244 and a first shaping portion 246 extending downwardly from the base portion 244 and positioned to contact the composite material laid up on the mold surface 204. The second pressing device 250 includes a second base portion 252 and a second shaping portion 254 extending downwardly from the base portion 252. The second base portion 252 can include flanges 256 configured to abut against corresponding portions of the mold surface 204. The first and second shaping portions 246 and 254 can each have a shape that is complementary to a corresponding surface shape of the mold surface 204.

The compaction tool 230 further includes a first expandable member 260 positioned proximate the base portion 244 of the first pressing device 242 and one or more second expandable members 262 (three are shown as second expandable members 262*a-c*) positioned between the support member 232 and the second base portion 252. The first and second expandable members 260 and 262*a-c* are configured to expand outwardly against the corresponding pressing devices 242 and 250 when inflated to move the pressing devices toward the tool 202, as described in detail below with reference to FIGS. 3A-3C. The first expandable member 260 can be at least partially attached to the second pressing device 250 and/or the first base portion 244 using an adhesive or other suitable means to secure the expandable member in place. The second expandable members 262*a-c* can be at least partially attached to the support member 232 and/or the second base portion 252 using generally similar means. In other embodiments, however, the first and/or second expandable members 260 and 262 do not have to be attached to the corresponding devices, and can instead be manually positioned at the desired locations within the compaction tool 230.

The first and second expandable members 260 and 262*a-c* can include flexible and/or elastic materials such as rubber, fiber-reinforced rubber, plastic, nylon, etc. In other embodiments, the first and second expandable members 260 and 262*a-c* can include other suitable flexible and/or expandable materials. In still further embodiments, the compaction tool 230 can include a first actuation device and one or more second actuation devices in addition to, or in lieu of, the first and second expandable members 260 and 262*a-c*. The first and second actuation devices can include pistons or other suitable actuators configured to move the first and second pressing devices 242 and 250 in a manner generally similar to the first and second expandable members 260 and 262*a-c* described above.

Figure 3A:
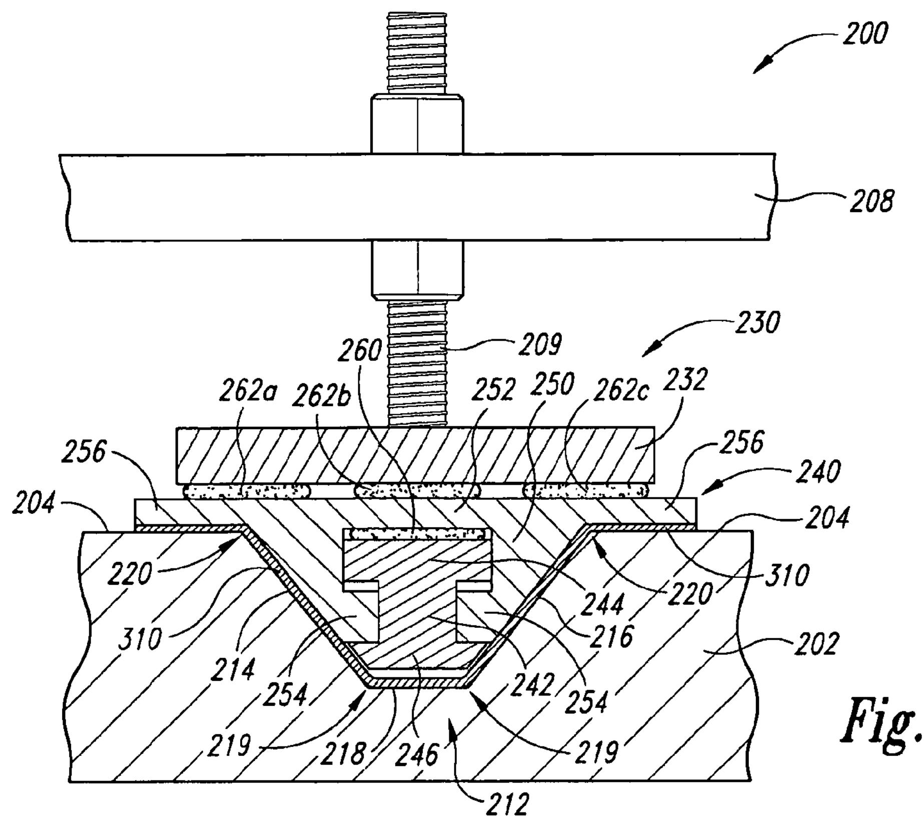
FIGS. 3A-3C are enlarged, cross-sectional end views of a portion of the composite tooling system of FIGS. 2A and 2B, illustrating an operation of a compaction tool configured in accordance with an embodiment of the invention.
Figure 3B:
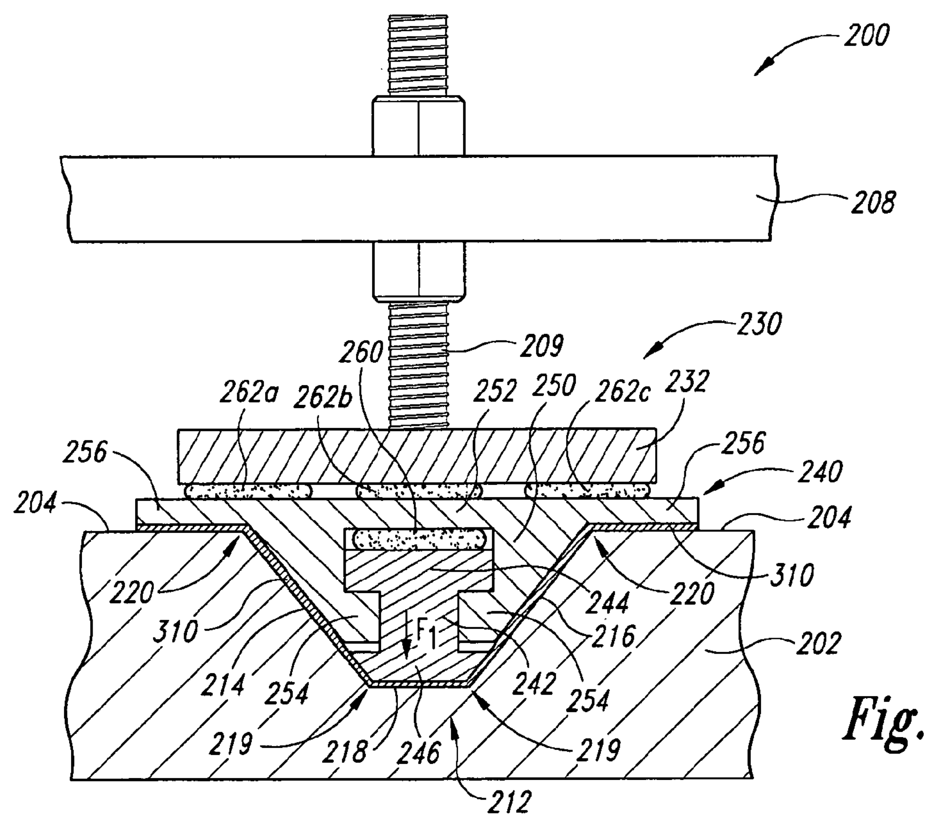
Figure 3C:
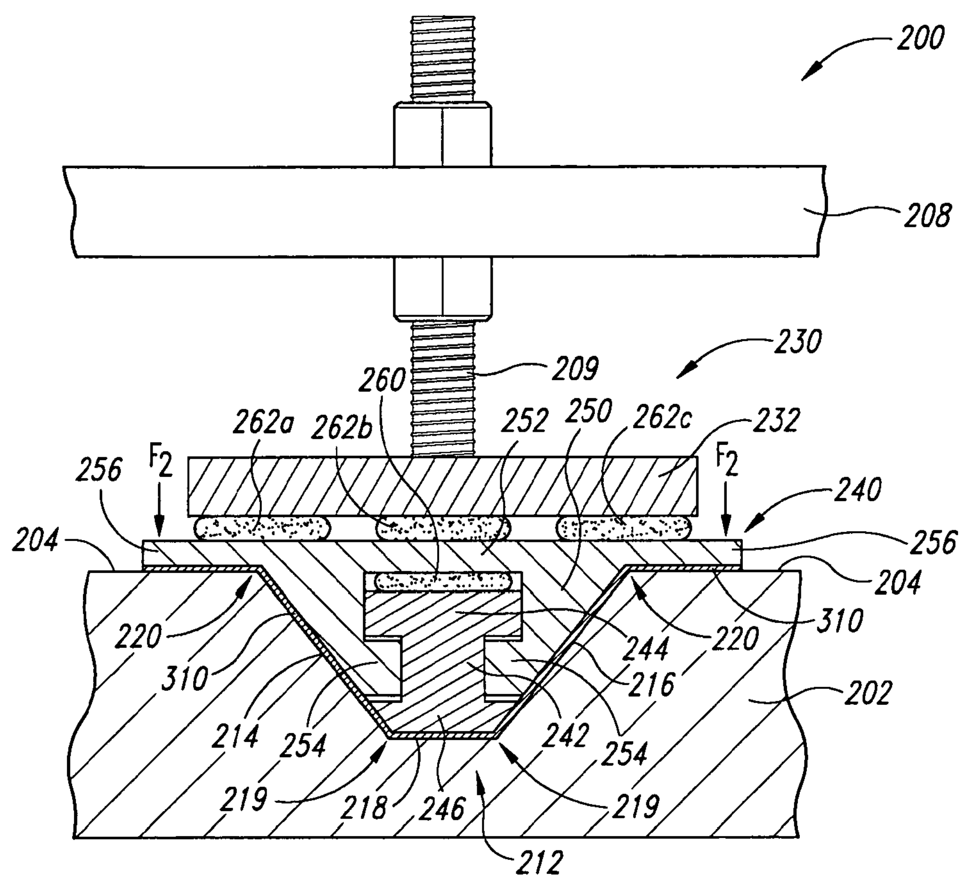

FIGS. 3A-3C are enlarged, cross-sectional end views of a portion of the tooling system 200 of FIGS. 2A and 2B, illustrating operation of the compaction tool 230 in accordance with an embodiment of the invention. Referring first to FIG. 3A, for example, manufacturing a composite part with the system 200 can include positioning a composite material 310 against the mold surface 204 of the tool 202. The composite material 310 can include fiber plies or prepregs including a plurality of woven and/or non-woven fibers preimpregnated with uncured or partially cured resin. The fibers can include glass, graphite, or other types of fibers, and the resin can include epoxies and other suitable materials. In other embodiments, the composite material 310 may include different materials.

The compaction tool 230 is moved into position relative to the tool 202 and the composite material 310 using, for example, the attachment members 206 and corresponding holding devices 213 (FIGS. 2A and 2B). In one aspect of this embodiment, the first fasteners 209 and the second fasteners 210 (FIGS. 2A and 2B) are generally only hand-tightened to hold the compaction tool 230 in place with respect to the tool 202 because overtightening the fasteners 209 and 210 can prematurely compact the composite material 310. Furthermore, as discussed previously, the holding device 213 can be held against the surface of the tool 202 with sufficient force to offset a pressing force applied to the composite material 310 by the compaction tool 230.

Referring next to FIG. 3B, the first expandable member 260 is inflated to axially move the first pressing device 242 against a corresponding portion of the composite material 310. More particularly, the pressure within the first expandable member 260 is increased to about 8-30 psi, thus driving the first pressing device 242 generally downward (as shown by arrow $F_1$) to compress the composite material 310 against the interior region 118 as well as both interior transition regions 119. The pressure within the first expandable member 260 can be maintained at the elevated pressure for a desired dwell time (e.g., about five minutes) to allow for material creep and to ensure that the composite material 310 is adequately compacted. In other embodiments, the pressure in the first expandable member 260 can be increased to a different pressure and/or the dwell time can vary. In one aspect of this embodiment, the second pressing device 250 does not generally press or otherwise act against the composite material 310 during this first stage when the first pressing device 242 is activated. For example, the flange portions 256 of the second pressing device 250 apply little or no pressure to the composite material 310 at the corresponding shoulder portions 220 of the tool 202.

Referring next to FIG. 3C, the pressure in the first expandable member 260 is reduced to about 1-2 psi after the desired dwell time and the pressure in the second expandable members 262*a-c* is increased to about 10-15 psi to drive the second pressing device 250 (as shown by arrows $F_2$) against all or substantially all the remaining portions of the composite material 310 laid up on the tool 202. The pressure within the second expandable members 262*a-c* can also be maintained for a desired dwell time (e.g., about five minutes) to allow for additional material creep and ensure that the composite material 310 along the first and second regions 214 and 216 and the shoulder portions 220 of the tool 202 is adequately compacted.

After the second pressing device 250 has compacted the corresponding portions of the composite material 310 for the desired dwell time, the first and second expandable members 260 and 262*a-c* can be generally deflated and the compaction tool 230 can be removed from the tool 202. The composite material 310 is then ready for additional processing and/or curing.

One feature of the system 200 including the compaction tool 230 described above is that the sequential pressurization of the first and second expandable members 260 and 262 to compact a first portion of the composite material 310 over the interior region 218 and transition regions 219 before compacting a second portion of the composite material at the shoulder regions 220 can prevent the composite material from bridging across the interior transition regions 219 and reduce and/or eliminate resin richness in the material. One advantage of this feature is that the resulting composite part may not have reduced fiber density, and hence reduced structural properties, in corresponding transition regions, inner/outer radii, and joggle areas. Another advantage of this feature is that processing costs can be significantly reduced because the number of parts that need to be reworked or scrapped is significantly reduced and/or eliminated.

Another feature of at least some of the embodiments of the system 200 including the compaction tool 230 described above is that the compaction tool 230 can be a one-piece tool that can be quickly installed with and/or uninstalled from the tool 202 using no tools or, in some cases, only common hand tools. An advantage of this feature is that it can greatly reduce the time and cost associated with manufacturing composite parts. In one application, for example, a plurality of compaction tools 230 can be installed with a plurality of corresponding channels of a female tool to manufacture composite stringers for an aircraft fuselage. The individual compaction tools 230 can be quickly installed and/or uninstalled from the female tool without disturbing adjacent compaction tools 230 and/or stringers. For example, the stringer compaction cycle can be in process at one channel of the female tool while composite material is being laid up at an adjacent channel of the tool for processing. Accordingly, the time and cost associated with manufacturing stringers can be significantly reduced because a number of stringers can be manufactured simultaneously using the compaction tools 230 with the female tool.

From the foregoing, it will be appreciated that specific embodiments of the invention have been described herein for purposes of illustration, but that various modifications may be made without deviating from the invention. For example, an expandable or inflatable first pressing device can be used in place of the generally rigid first pressing device 242. The expandable first pressing device can be inflated to a suitable pressure to compress the composite material along the interior region 218 and corresponding transition regions 219 as described above. The pressurization sequence during processing can remain generally the same as described above. For example, the pressure in the expandable first pressing device can be reduced when the pressure in the second expandable members 262*a-c* is increased to move the second pressing device 250 into position. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A tooling system for manufacturing a fiber-reinforced resin part, the tooling system comprising:

a tool having a female mold surface configured to support a plurality of fibers pre-impregnated with resin;

a first actuation device configured to axially move a first pressing device toward the mold surface, the first actuation device comprising a first expandable member positioned to move the first pressing device toward the mold surface; and one or more second actuation devices adjacent to a second pressing device and positioned to move the second pressing device toward the mold surface, the one or more second actuation devices comprising one or more second expandable members positioned to move the second pressing device toward the mold surface.

2. The tooling system of claim 1 wherein the first pressing device is axially movable relative to and independent of the second pressing device, and wherein the first pressing device has a generally constant shape while moving relative to the second pressing device.

3. The tooling system of claim 1 further comprising a pressing member carried by a support member and configured to move away from the support member toward the mold surface to compress a portion of the fibers against the mold surface, the pressing member including the first pressing device and the second pressing device carrying the first pressing device, and wherein the pressing member includes a flexible, polymer material.

4. The tooling system of claim 1 wherein:

the first expandable member includes a first bladder configured to be inflated to about 8-30 psi to move the first pressing device toward the mold surface, the first pressing device being axially movable relative to and independent of the second pressing device; and the one or more second expandable members include three elongate bladders configured to be inflated to about 10-15 psi to move the second pressing device toward the mold surface.

5. The tooling system of claim 1 further comprising a compaction tool releasably attached to the tool using one or more vacuum cups.

6. The tooling system of claim 1 wherein the first pressing device comprises a base portion and a shaping portion.

7. The tooling system of claim 1 wherein the second pressing device comprises a base portion and a shaping portion.

8. The tooling system of claim 1 wherein the second pressing device comprises at least one flange configured to abut a corresponding portion of the female mold surface.

9. The tooling system of claim 1 wherein the first expandable member comprises an elastic material.

10. The tooling system of claim 4 wherein the first bladder comprises a rubber material.

11. The tooling system of claim 1 wherein the first expandable member comprises an elastic material.

12. The tooling system of claim 4 wherein the second bladder comprises a rubber material.

13. The tooling system of claim 1 wherein the first actuation device comprises one or more pistons.

14. A tooling system for manufacturing a part, the tooling system comprising:

a tool having a female mold surface configured to support a plurality of fibers pre-impregnated with resin;

a first actuation device adjacent to a first pressing device and positioned to axially move the first pressing device toward the female mold surface, the first actuation device comprising a first expandable member positioned to move the first pressing device toward the mold surface when the first expandable member is inflated; and one or more second actuation devices adjacent to a second pressing device and positioned to move the second pressing device toward the female mold surface, the one or more second actuation devices comprising one or more second expandable members positioned to move the second pressing device toward the mold surface when the one or more second expandable members are inflated.

15. The tooling system of claim 14 further comprising a pressing member configured to move toward the female mold surface to compress a portion of the fibers against the female mold surface, the pressing member including the first pressing device and the second pressing device carrying the first pressing device.

16. The tooling system of claim 14 wherein the first expandable member includes a first bladder configured to be inflated to about 8-30 psi to move the first pressing device toward the female mold surface.

17. The tooling system of claim 14 wherein the one or more second expandable members include a plurality of bladders configured to be inflated to about 10-15 psi to move the second pressing device toward the female mold surface.

18. A tooling system for manufacturing a fiber-reinforced resin part, the tooling system comprising:

a tool having a female mold surface configured to support a plurality of fibers pre-impregnated with resin, the female mold surface having a first side region, a second side region generally facing the first side region, an interior region between the first and second side regions, transition regions between the first and second side regions and the interior region, and shoulder regions outboard of the first and second side regions; and a compaction tool configured to cooperate with the tool, the compaction tool having a support member releasably attached to the tool;

a pressing member carried by the support member and configured to move away from the support member toward the mold surface to compress a portion of the fibers against the mold surface, the pressing member including a first pressing device and a second pressing device carrying the first pressing device;

a first actuation device adjacent to the first pressing device and positioned to axially move the first pressing device toward the mold surface, the first actuation device comprising a first expandable member positioned to move the first pressing device toward the mold surface when the first expandable member is inflated; and one or more second actuation devices adjacent to the second pressing device and positioned to move the second pressing device toward the mold surface, the one or more second actuation devices comprising one or more second expandable members positioned to move the second pressing device toward the mold surface when the second expandable member is inflated.

* * * * *